US010484782B1

(12) United States Patent
Ganeshkumar et al.

(10) Patent No.: US 10,484,782 B1
(45) Date of Patent: Nov. 19, 2019

(54) AUDIO DEVICE WITH PRE-ADAPTATION

(71) Applicant: Bose Corporation, Framingham, MA (US)

(72) Inventors: Alaganandan Ganeshkumar, North Attleboro, MA (US); Ricardo Carreras, Southborough, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 16/056,046

(22) Filed: Aug. 6, 2018

(51) Int. Cl.
*H04R 1/10* (2006.01)
*G10L 21/0224* (2013.01)
*G10L 25/84* (2013.01)
*H04R 1/40* (2006.01)
*H04R 3/00* (2006.01)
*H04R 5/033* (2006.01)
*H04R 5/04* (2006.01)
*H04R 29/00* (2006.01)
*G10L 21/0216* (2013.01)

(52) U.S. Cl.
CPC ........ *H04R 1/1083* (2013.01); *G10L 21/0224* (2013.01); *G10L 25/84* (2013.01); *H04R 1/406* (2013.01); *H04R 3/005* (2013.01); *H04R 5/033* (2013.01); *H04R 5/04* (2013.01); *H04R 29/001* (2013.01); *G10L 2021/02166* (2013.01); *H04R 2400/01* (2013.01)

(58) Field of Classification Search
CPC ...... H04R 1/1083; H04R 1/406; H04R 3/005; H04R 5/033; H04R 5/04; H04R 29/001; H04R 2400/01; G10L 21/0224; G10L 25/84; G10L 2021/02166
See application file for complete search history.

(56) References Cited

U.S. PATENT DOCUMENTS

2014/0365225 A1* 12/2014 Haiut ..................... G10L 15/22 704/275
2016/0322045 A1* 11/2016 Hatfield ................. G10L 15/22

FOREIGN PATENT DOCUMENTS

WO WO-2017164840 A1 * 9/2017 ............... H04B 1/38

* cited by examiner

*Primary Examiner* — Mark Fischer
(74) *Attorney, Agent, or Firm* — Brian M. Dingman; Dingman IP Law, PC

(57) ABSTRACT

An audio device with at least one microphone adapted to receive sound from a sound field and create an output, and a processing system that is responsive to the output of the microphone. The processing system is configured to use a signal processing algorithm to detect speech in the output, detect a predefined trigger event indicating a possible change in the sound field, and modify the signal processing algorithm upon the detection of the predefined trigger event.

20 Claims, 3 Drawing Sheets

AUDIO DEVICE WITH PRE-ADAPTATION

BACKGROUND

This disclosure relates to an audio device with a microphone.

Audio devices that use one or more microphones to continuously monitor the sound field for a spoken wakeup word and spoken commands can use signal processing algorithms, such as beamformers, to increase spoken word detection rates in noisy environments. However, beamforming and other complex signal processing algorithms can use substantial amounts of power. For battery-operated audio devices, the resultant battery drain can become a use limitation.

SUMMARY

All examples and features mentioned below can be combined in any technically possible way.

In one aspect, an audio device includes at least one microphone adapted to receive sound from a sound field and create an output, and a processing system that is responsive to the output of the microphone. The processing system is configured to use a signal processing algorithm to detect speech in the output, detect a predefined trigger event indicating a possible change in the sound field, and modify the signal processing algorithm upon the detection of the predefined trigger event. The audio device may comprise headphones.

Embodiments may include one of the above and/or below features, or any combination thereof. The audio device may comprise a plurality of microphones that are configurable into a microphone array. The signal processing algorithm may comprise a beamformer that is configured to use multiple microphone outputs to detect speech in the output. The beamformer may comprise a plurality of beamformer coefficients, and modifying the signal processing algorithm upon detection of a trigger event may comprise determining beamformer coefficients. The trigger event may comprise an increase in noise in the sound field.

Embodiments may include one of the above and/or below features, or any combination thereof. The predetermined trigger event may comprise the passing of a predetermined amount of time. The predetermined amount of time may be variable. A variation in the predetermined amount of time may be based on the sound field in the past.

Embodiments may include one of the above and/or below features, or any combination thereof. The predetermined trigger event may comprise a change in the sound field. The change in the sound field may comprise an increase in noise in the sound field. The sound field may be monitored by a single microphone with an output that is provided to a processor. The sound field may be monitored in only select frequencies of the sound field. If the noise increases in the select frequencies, beamformer coefficients may be calculated by the processing system.

Embodiments may include one of the above and/or below features, or any combination thereof. The predetermined trigger event may comprise input from a sensor device. The sensor device may comprise a motion sensor, and the input from the motion sensor may be interpreted to detect motion of the audio device. Detecting a trigger event may comprise monitoring both spectral and spatial response changes. Detecting a trigger event may comprise monitoring spatial energy changes. Modifying the signal processing algorithm upon the detection of a trigger event may comprise determining beamformer coefficients.

In another aspect, an audio device includes a plurality of microphones that are configurable into a microphone array and are adapted to receive sound from a sound field and create an output. There is a processing system that is responsive to the output of the at least one microphone and is configured to use a beamformer signal processing algorithm to detect speech in the output, wherein the beamformer is configured to use multiple microphone outputs to detect speech in the output, and wherein the beamformer comprises a plurality of beamformer coefficients. The processing system is also configured to detect a predefined trigger event indicating a possible change in the sound field, wherein the predefined trigger event comprises one or more of an increase in noise in the sound field, the passing of a predetermined amount of time, a change in the sound field and an input from a sensor device. The processing system is further configured to modify the beamformer signal processing algorithm upon the detection of the predefined trigger event, wherein the modification comprises determining beamformer coefficients.

DETAILED DESCRIPTION

Figure 1:
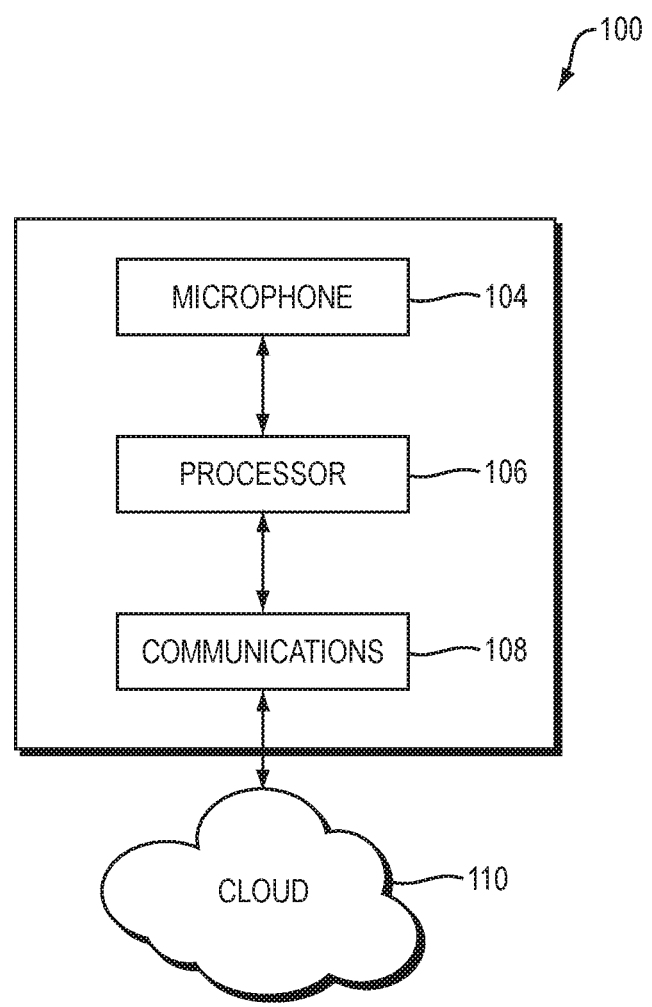
FIG. 1 is a schematic block diagram of an audio device with pre-adaptation.

For devices with voice-controlled user interfaces (e.g., to activate a virtual personal assistant (VPA)), the device has to be constantly listening for the proper cue. In some such devices, a special word or phrase, which is sometimes called a "wakeup word," is used to activate the speech-recognition features of the device. The user often speaks command(s) following the wakeup word. In some examples, the present audio device with pre-adaptation utilizes one or more microphones to constantly listen for a wakeup word. The microphones and processors used to detect a wakeup word and spoken commands use power. In battery-operated devices, power use can shorten battery life and thus negatively impact the user experience. However, devices need to accurately detect wakeup words and spoken commands or there will be a degraded user experience, e.g., there may be false positives, where a device thinks a wakeup word or command has been spoken when it has not, or there may be false negatives where a device misses detecting a wakeup word or command that has been spoken. This can be problematic and annoying for the user.

An adaptive algorithm, such as an adaptive beamformer, can be used to help detect a wakeup word and/or spoken commands in the presence of noise. Typical adaptive algorithms require a noise-only adaptation period to maximize the extraction of speech from a noisy environment. In noisy environments the optimal adaptation period can be in the range of 0.5 to 1 seconds. During the adaptation period the algorithm calculates updated beamformer filter coefficients that are used by the algorithm in the speech recognition process. Beamformer filter coefficients are well understood by those skilled in the technical field, and so will not be further described herein.

In order to adapt and then work well, beamformers require the user to pause after saying the wakeup word (e.g., "OK Google") so that the beamformer can adapt to the current noise conditions. Only after the adaptation should the user then speak a command. The pause should be sufficiently long for the beamformer to adapt. If the beamformer is always running, the adaptation can be run essentially continuously; this allows the beamformer to work well even without an extended pause after the wakeup word. However, in low-power audio devices (e.g., those that run off of batteries), constantly running the beamformer so that it can be adapted and ready to detect voice results in reduced battery life.

In order to both maintain battery life and have a well-adapted beamformer, the present disclosure contemplates adapting the beamformer when the environment within the expected sound detection range or sound field of the audio device has changed in some manner such that is possible or likely to require updated beamformer filter coefficients in order for the beamformer to work well. Such prospective beamformer adaptation may be termed "pre-adaptation." An environmental change that may be indicative of a possible change in the sound field (sometimes termed herein a "trigger event") can be detected and used to trigger a beamformer pre-adaptation. The types of trigger events detected are typically but not necessarily predefined. Pre-adaptation of the beamformer allows the beamformer to be normally off, and then turned on and adapted only as necessary, resulting in less power use and thus longer battery life. Pre-adaptation of beamformer filter coefficients will establish coefficients that are closer to the ideal coefficients for whenever the user speaks the wakeup word. Pre-adaptation thus can help the audio device to be better able to detect the wakeup word. Also, any time needed for the system to adapt to current noise conditions should be decreased, resulting in a shorter adaptation period before the system is ready to receive speech signals such as commands. Ideally, any needed adaptation period will be in the range of the normal pause a person would take between speaking a wakeup word and a command following the wakeup word.

The change in the environment that is detected and used to trigger a beamformer adaptation can vary. In one case, the trigger can be related to the noise level. For example, if the environment is noisy, or if the noise level increases, the beamformer can be pre-adapted. Alternatively or additionally, the trigger can be based on motion or a change in location. For example, the beamformer can be pre-adapted when a sensor detects that the audio device has changed locations or is moving (e.g., if the wearer of headphones takes the headphones off or puts them on, or the wearer gets into a car). Alternatively or additionally, the trigger event can be the passage of time, such that the beamformer can be pre-adapted at periodic intervals rather than the pre-adaptation being based on an irregular separately detected trigger event.

The present audio device with pre-adaptation can accomplish good detection of wakeup words and spoken command words while decreasing the beamformer startup time. The audio device includes one or more microphones. When the device has multiple microphones, they may be configurable into a microphone array. The microphone(s) receive sound from a sound field, which is typically from the area surrounding the user. The user may be the wearer of headphones or a user of a portable speaker that comprises the subject audio device, as two non-limiting examples. The audio device includes a processing system that is responsive to the microphones. The processing system is configured to use a signal processing algorithm (such as a beamformer) to help detect one or both of a wakeup word and a spoken command.

In quiet environments, a wakeup word or a spoken command can typically be successfully detected with a single microphone. However, in noisy environments, particularly in situations when there are multiple people speaking, the detection is improved when two (or more) microphones are arrayed as a beamformer optimized to pick up the user's voice and used to feed the wakeup word/command detector. The processing system can use algorithms other than beamforming to improve detection, for example, blind source separation, echo cancellation, and adaptive noise mitigation. Beamforming and other algorithms that work well in the presence of noise can require more power to implement as compared to processing the output of a single microphone. Accordingly, in battery-powered audio devices such as some headphones and portable speakers, battery life can be negatively impacted by the need to beamform or use another complex signal processing algorithm/method for wakeup word/spoken command detection. Beamformers use power, and if they are always on and ready to detect a word or phrase, the power drain can be significant. It is thus preferable to operate the beamformer only after the wakeup word has been detected or is spoken. However, adaptive beamformers require a noise-only adaptation period before the audio system is ready to receive speech signals that are interrogated for commands from the user. This adaptation period can sometimes be one second or more, depending on the complexity of the noise environment. The necessary adaptation period can be markedly reduced by pre-adapting the algorithm based on a trigger, as described above.

Elements of figures are shown and described as discrete elements in a block diagram. These may be implemented as one or more of analog circuitry or digital circuitry. Alternatively, or additionally, they may be implemented with one or more microprocessors executing software instructions. The software instructions can include digital signal processing instructions. Operations may be performed by analog circuitry or by a microprocessor executing software that performs the equivalent of the analog operation. Signal lines may be implemented as discrete analog or digital signal lines, as a discrete digital signal line with appropriate signal processing that is able to process separate signals, and/or as elements of a wireless communication system.

When processes are represented or implied in the block diagram, the steps may be performed by one element or a plurality of elements. The steps may be performed together or at different times. The elements that perform the activities may be physically the same or proximate one another, or may be physically separate. One element may perform the actions of more than one block. Audio signals may be encoded or not, and may be transmitted in either digital or analog form. Conventional audio signal processing equipment and operations are in some cases omitted from the drawing.

FIG. 1 is a schematic block diagram of an audio device 100 with pre-adaptation. Audio device 100 can be used for wakeup word detection and detection of commands that follow the wakeup word. Audio device 100 includes a microphone 104 that is situated such that it is able to detect sound from a sound field in the proximity of device 100. The sound field typically includes both human voices and noise. Processor 106 receives the microphone output and uses one or more signal processing algorithms (such as those described herein) to detect in the received sound a wakeup word and/or command(s) that follow a wakeup word. Communications module 308 is configured to transmit and receive in a manner known in the field (e.g., wirelessly). Communication can occur to and from cloud 110, and/or to and from another function or device.

Processor 106 is configured to implement at least one signal processing algorithm that can be used to detect a wakeup word and/or a spoken command in the microphone output. In order to accurately detect words and phrases in the presence of noise, processor 106 can in one non-limiting example be enabled to modify the signal processing algorithm that is used to detect the word or phrase if the sound field changes, for example if there is more noise or more people are talking. There are a number of known signal processing methods that are able to facilitate detection of voice signals and rejection of noise. In general, more complex signal processing algorithms that are better at detecting voice in the presence of noise tend to require additional processing and thus tend to use more power than simpler techniques.

This disclosure contemplates the use of one or more such signal processing algorithms for wakeup word and/or spoken command detection. The algorithms can be used independently or in combination with each other. One such algorithm, discussed in more detail below, is beamforming. Beamforming is a signal processing technique that uses an array of spaced microphones for directional signal reception. Beamforming can thus be used to better detect a voice in the presence of noise. Other signal processing algorithms include blind source separation and adaptive noise mitigation. Blind source separation involves the separation of a set of signals from a set of mixed signals. Blind source separation typically involves the use of a plurality of spaced microphones to detect the mixed signal, and processing in the frequency domain. In the present disclosure, blind source separation can help to separate a voice signal from mixed voice and noise signals. Adaptive noise mitigation methods are able to adaptively remove frequency bands in which noise exists, in order to mitigate the noise signal and thus strengthen the voice signal. Adaptive noise mitigation techniques can be used with a single microphone output, or with the outputs of multiple microphones.

In the present disclosure different signal processing techniques can be used to improve wakeup word/spoken command detection. Such techniques can be used with one microphone, or more than one microphone. For the particular signal processing technique(s) used that require adaptation before use, the pre-adaptation can be run when there has been some change that makes it likely that algorithm adaptation should occur before the algorithm is used to detect desired speech. Examples of such changes are described above, and in some cases are further described below.

Figure 2:
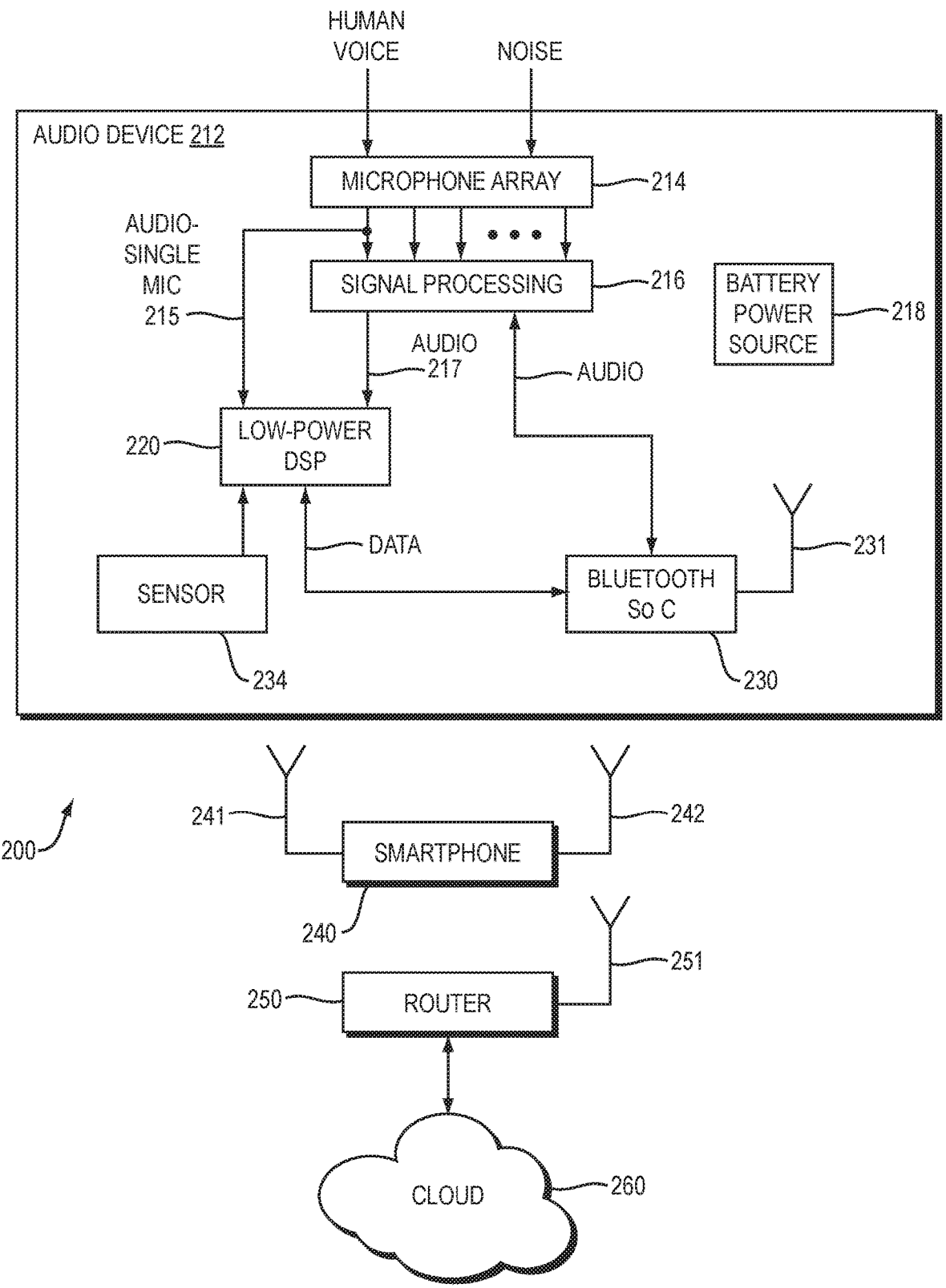
FIG. 2 is a more detailed block diagram of an audio device with pre-adaptation.

FIG. 2 is a schematic block diagram of an audio system 200 that includes an audio device 212, with pre-adaptation and detection of wakeup words and commands that follow a wakeup word. Audio device 212 includes a microphone array 214 that includes one or more microphones. The microphones are situated such that they are able to detect sound from a sound field in the proximity of device 212. The sound field typically includes both human voices and noise. Device 212 may also have one or more electro-acoustic transducers (not shown) so that it can also be used to create sound. Device 212 includes a power source 218; in this non-limiting example, the power source is a battery power source. Many audio devices will have other components or functionality that is not directly related to the present disclosure and which are not shown in the drawings, including additional processing and a user interface, for example.

Examples of audio devices include but are not limited to headphones, headsets, wearable speakers, wearable audio eyeglasses, smart-speakers, and wireless speakers. In the description that follows audio device 212 will in some cases be described as a wireless, battery-operated headset or headphones, but the disclosure is not limited to such audio devices, as the disclosure may apply to any device that uses one or more microphones to detect a spoken word or phrase.

In one non-limiting example audio device 212 includes signal processing 216. Signal processing 216 alone or together with low-power digital signal processor (DSP) 220 can be used to accomplish some or all of the signal processing algorithms that are used for pre-adaptation of a beamformer or other signal processing algorithm, and detection of wakeup words and commands, as described herein. Signal processing 216 can receive the outputs of all the microphones of array 214 that are in use, as indicated by the series of arrows. In one non-limiting example, signal processing 216 accomplishes a beamformer. Beamformers are known in the art and are in some cases a means of processing the outputs of multiple microphones to create a spatially-directed sound detection. Generally, the use of more microphones allows for greater directivity and thus a greater ability to detect a desired sound (such as the user's voice) in the presence of undesired sounds (such as other voices, and other environmental noise). However, beamforming requires power for multiple microphones and greater processing needs, as compared to sound detection with a single microphone, and no beamforming. Low-power DSP 220 is configured to receive over line 215 the output of a single, non-beamformed microphone. DSP 220 may also receive from signal processing 216 over line 217 the processed (e.g., beamformed) outputs of two or more microphones. When device 212 uses only a single microphone to detect a wakeup word, signal processing 216 can be bypassed, or can simply not be involved in microphone output processing. DSP 220 may also be responsive to a separate sensor 234, functions and uses of which are further described below. Audio device 212 also includes Bluetooth system on a chip (SoC) 230 with antenna 231. SoC 230 receives data from DSP 220, and audio signals from signal processing 216. SoC 230 provides for wireless communication capabilities with e.g., an audio source device such as a smartphone, tablet, or other mobile device. Audio device 212 is depicted as in wireless communication (e.g., using Bluetooth®, or another wireless standard) with smartphone 240, which has antenna 241. Smartphone 240 can also be in wireless communication with the cloud 260, typically by use of a data link established using antenna 242, and antenna 251 of router/access point 250.

As described above, a beamformer is but one non-limiting example of a technique that can be applied to the outputs of the microphone array to improve detection of a wakeup word and spoken commands. Other techniques that can be accomplished by signal processing 216 may include blind source separation, adaptive noise mitigation, AEC, and other signal processing techniques that can improve wakeup word and/or spoken command detection, in addition to or in lieu of beamforming. These techniques would typically be applied prior to the audio signal (the single mic audio signal 215 or the audio signal based on multiple microphones 217) being passed to the DSP 220. Binaural signal processing can help to detect voice in the presence of noise. Binaural voice detection techniques are disclosed in U.S. patent application Ser. No. 15/463,368, entitled "Audio Signal Processing for Noise Reduction," filed on Mar. 20, 2017, the entire disclosure of which is incorporated by reference herein.

Smartphone, tablet or other portable computer device 240 is not part of the present audio device, but is included in system 200, FIG. 2, to establish one of many possible use scenarios of audio device 212. For example, a user may use headphones to enable voice communication with the cloud, for example to conduct internet searches using one or more VPAs (e.g., Siri® provided by Apple Inc. of Cupertino, Calif., Alexa® provided by Amazon Inc. of Seattle, Wash., Google Assistant® provided by Google of Mountain View, Calif., Cortana® provided by Microsoft Corp. of Redmond, Wash., and S Voice® provided by Samsung Electronics of Suwon, South Korea). Audio device 212 (which in this case comprises headphones) is used to detect a wakeup word, for example as a means to begin a voice connection up to the cloud via smartphone 240.

As described herein, environmental noise may impact the ability of audio device 212 to correctly detect spoken words. One specific example of noise may include echo conditions, which can occur when a user or wearer of the audio device is listening to music. When echo conditions are present on one or more microphones that are being used for wakeup word and/or spoken command detection, the echo can mask the user's speech when the word is uttered, and lead to problems with word detection. The audio device 212 can be enabled to detect echo conditions in the outputs of the microphones, and, as needed, modify the signal processing algorithm to be more robust in the presence of the echo conditions. For example, DSP 220 can be enabled to use an acoustic echo cancellation (AEC) function (not shown) when echo is detected. Echo cancellation typically involves first recognizing the originally transmitted signal that re-appears, with some delay, in the transmitted or received signal. Once the echo is recognized, it can be removed by subtracting it from the transmitted or received signal. This technique is generally implemented digitally using a DSP or software, although it can be implemented in analog circuits as well.

Audio device 212 can be configured to modify a signal processing algorithm that is used to detect speech in the presence of noise. Exemplary signal processing algorithms are described above. A beamformer algorithm is used to illustrate the disclosure, but the disclosure applies to other algorithms. As described above, an audio device 212 includes at least one microphone that is adapted to receive sound from a sound field and create an output. Typically, the audio device includes a plurality of microphones that are configurable into a microphone array. The audio device processing system is responsive to the output of the microphone(s) and is configured to use a signal processing algorithm to detect speech in the presence of noise, detect a predefined trigger event, and modify the signal processing algorithm upon the detection of a trigger event. The beamformer algorithm is typically configured to use multiple microphone outputs to detect speech in the presence of noise. An adaptive beamformer comprises a plurality of beamformer coefficients. The modification of the beamformer upon detection of a trigger event may comprise determining (i.e., updating) the beamformer coefficients.

In one non-limiting example, the predetermined trigger event that is used to modify the beamformer comprises a change (e.g., a volume increase) in the sound field. For example, the sound field can be continuously monitored with a single microphone of the array, e.g., using a separate low-power DSP. This processor can be configured to periodically wake up and determine the noise level. When the noise level increases above the previous level (e.g., either absolutely, or by a predefined amount), the DSP can wake up the beamformer DSP, which can calculate and store new beamformer coefficients, and go back to sleep. More power can be saved by operating the low-power DSP in a small number of spectral bands that are most likely indicative of noise rather than as a broadband sensor. For example, frequencies around 300 Hz to 8 kHz can be monitored. This further simplifies the processing accomplished with the low-power DSP and thus uses less power than would be the case if the entire spectrum was looked at. This system allows the beamformer to be pre-adapted based on environmental noise, so it is ready to detect words without needing to re-adapt before it is used.

In another non-limiting example, the predetermined trigger event comprises the passing of a predetermined amount of time. In this case the beamformer DSP is periodically woken up and new beamformer coefficients are calculated and saved in non-volatile memory. The beamformer DSP then would go back to sleep. The predetermined amount of time could be fixed or variable. A fixed value can be selected to achieve desired results. For example it could be every 10 seconds. A variation in the predetermined amount of time can be based on one or more other variables, for example the sound field in the past. For example, the processing of the audio device can be configured to look at recent changes in the sound field. If the sound field is relatively stable, then the predetermined time between beamformer coefficient updates can be relatively long, on the assumption that the beamformer coefficients are not likely to substantially change in the short term when the sound field is relatively stable. On the other hand, if the sound field is highly variable, then it is more likely that the beamformer coefficients will need to be updated more frequently, and so the time period can be made shorter.

In another non-limiting example, the predetermined trigger event comprises input from a sensor device such as sensor 234, FIG. 2. The sensor can be part of the audio device, or it can be separate from the audio device and in communication with the audio device. For example, the sensor device can comprise a motion sensor, and the input from the motion sensor can be interpreted to detect motion of the audio device. Motion can be sensed based on input from a smart phone being carried by the user, for example based on GPS location. Pre-adaptation decisions can be based on location, or change in location. For example, if the user has entered a train station there is likely much more noise and noise monitoring and pre-adaptation should be conducted more frequently. In one use scenario, if motion of the audio device is detected it can be presumed that the sound field may change (e.g., the wearer of headphones is moving, perhaps into a noisier or quieter location) and so a pre-adaptation can take place. When a user moves, it is expected that the sound field might change, and might change more frequently as compared to a stationary user, in which case pre-adaptation can be performed once, or perhaps more frequently than normal while motion is detected. Motion can be detected in any manner that is known in the field, and the processor that performs the pre-adaptation (beamformer coefficient calculation) can be responsive to motion sensed by the motion sensor.

Detecting a trigger event can comprise monitoring both spectral and spatial response changes. For example if a single microphone is only available in low power state one can monitor energy histograms in two or more bands and if any significant changes are detected pre-adaptation can be triggered. Spatial energy changes can be detected if two or more microphones are available to the low power state by a) using simple combinations of microphones to create a plurality of beam patterns each pointing at different angles and monitoring the spatial energy profile using those beams to pre-trigger or b) run a low bandwidth (example use only a subset of the frequency bands), low mips version of the main adaptive beamformer whose primary goal is to flag potential change in spatial response (as opposed to produce intelligible voice output).

Figure 3:
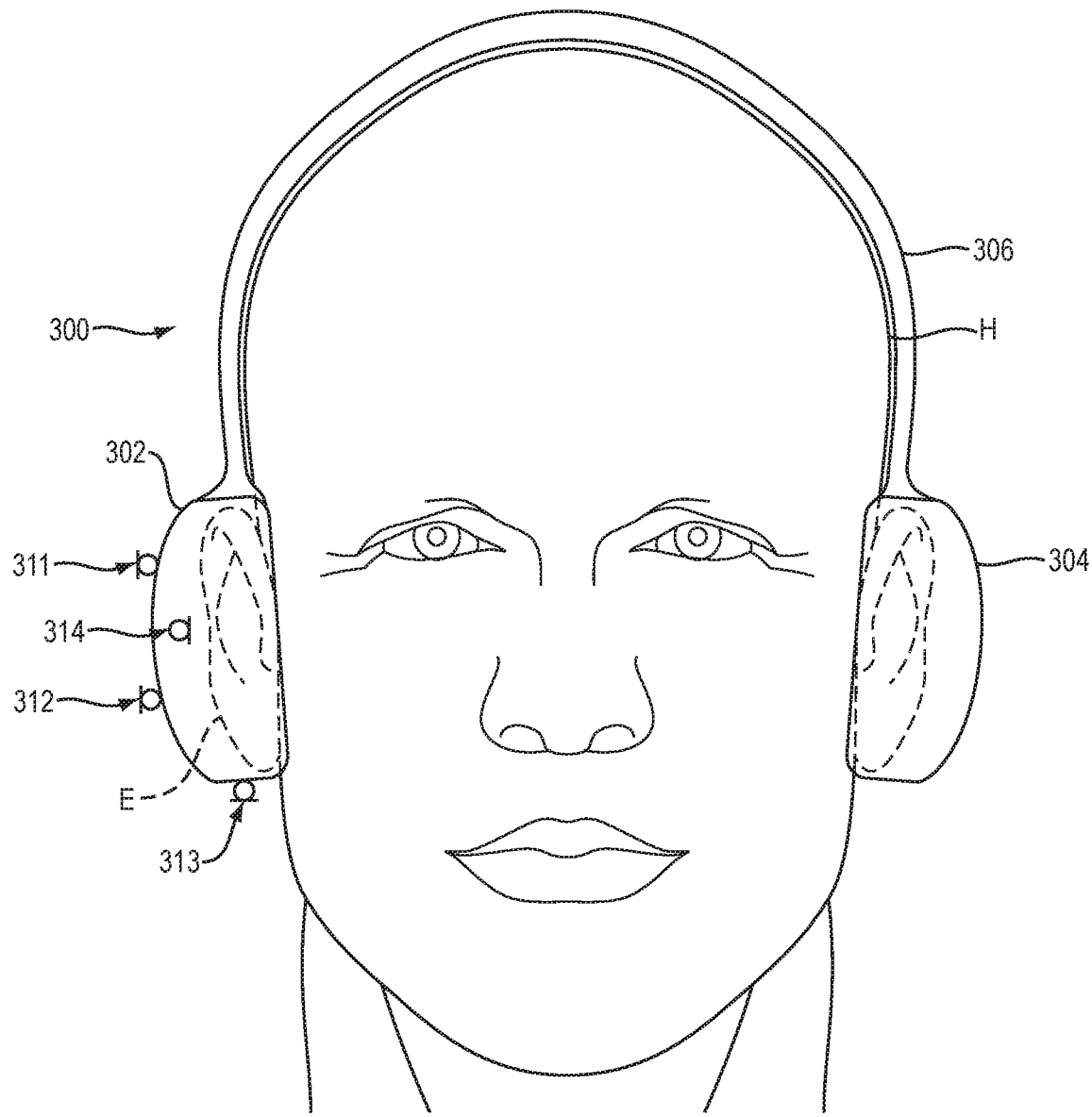
FIG. 3 is a representation of a user wearing headphones that comprise an audio device with pre-adaptation.

FIG. 3 is a schematic diagram of headphones 300, which are one non-limiting example of an audio device with pre-adaptation of a signal processing algorithm, used for detection of a wakeup word and/or spoken commands. In the example of FIG. 3, headphones 300 include headband 306, and on-ear or over-ear earcups, 304 and 302. Details relating to earcup 302 are presented here and would typically exist for both earcups (if the headphones have two earcups). Details are given for only one earcup, simply for the sake of simplicity. Headphones could take on other form factors, including in-ear headphones or earbuds and shoulder or neck-worn audio devices, including open ear audio devices that leave a wearer's ears open to the environment, for example.

Earcup 302 sits over ear E of head H. One or more external microphones are mounted to earcup 302 such that they can detect sound pressure level (SPL) outside of the earcup. In this non-limiting example, three such microphones 311, 312, and 313, are included. Microphones 311, 312, and 313 can be located at various positions on earcup 302; the positions shown in FIG. 3 are exemplary. Also, there can be but need not be one or more internal microphones inside of the earcup, such as microphone 314, which detects SPL inside of the earcup. Microphones inside an earcup can be used for noise cancellation, voice activity detection, and other uses, as is known in the art. External microphones 311-313 are typically used for wakeup word/ spoken command detection as described herein and can also be used for noise cancellation or other communications applications. Internal microphone(s) can alternatively or additionally be used for wakeup word and/or spoken command detection. In situations where only a single microphone is used, it will typically but not necessarily be the external microphone closest to the mouth, which in this case would be microphone 313. Also, beamforming can sometimes be improved by using one or more microphones on both earcups. Accordingly, for headphones with two earcups, the subject audio device can use microphones from one or both earcups. In situations in which there is substantial noise of some type that impacts the external microphones' ability to detect the user's voice (e.g., if it is windy and all the outside microphones 311-313 are overwhelmed by wind noise), inside microphone 314 can be used to detect voice, as is known in the art.

Embodiments of the systems and methods described above comprise computer components and computer-implemented steps that will be apparent to those skilled in the art. For example, it should be understood by one of skill in the art that the computer-implemented steps may be stored as computer-executable instructions on a computer-readable medium such as, for example, floppy disks, hard disks, optical disks, Flash ROMS, nonvolatile ROM, and RAM. Furthermore, it should be understood by one of skill in the art that the computer-executable instructions may be executed on a variety of processors such as, for example, microprocessors, digital signal processors, gate arrays, etc. For ease of exposition, not every step or element of the systems and methods described above is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the disclosure.

A number of implementations have been described. Nevertheless, it will be understood that additional modifications may be made without departing from the scope of the inventive concepts described herein, and, accordingly, other embodiments are within the scope of the following claims.

What is claimed is:

1. An audio device, comprising:
   at least one microphone adapted to receive sound from a sound field and create an output; and
   a processing system that is responsive to the output of the at least one microphone and is configured to:
      use an adaptive signal processing algorithm to detect speech in the output of the at least one microphone, wherein the adaptive algorithm uses calculated and stored algorithm coefficients to detect speech;
      detect a change in a level of noise in the sound field; and
      in response to the detection of a change in the noise level, calculate new algorithm coefficients and store the new algorithm coefficients for use in detecting speech.

2. The audio device of claim 1, comprising a plurality of microphones that are configurable into a microphone array.

3. The audio device of claim 2, wherein the adaptive signal processing algorithm comprises a beamformer that is configured to use multiple microphone outputs to detect speech in the output.

4. The audio device of claim 3, wherein the beamformer comprises a plurality of beamformer coefficients, and wherein calculating the new algorithm coefficients comprises determining beamformer coefficients.

5. The audio device of claim 4, wherein the change in the level of noise comprises an increase in noise in the sound field.

6. The audio device of claim 1, further comprising detecting the passing of a predetermined amount of time, and in response calculating new algorithm coefficients and storing the new algorithm coefficients for use in detecting speech.

7. The audio device of claim 6, wherein the predetermined amount of time is variable.

8. The audio device of claim 7, wherein a variation in the predetermined amount of time is based on the sound field in the past.

9. The audio device of claim 1, wherein the change in the level of noise comprises an increase in noise in the sound field.

10. The audio device of claim 1, wherein the sound field is monitored by a single microphone with an output that is provided to a processor.

11. The audio system of claim 1, wherein the sound field is monitored in only select frequencies of the sound field.

12. The audio device of claim 11, wherein if the noise increases in the select frequencies beamformer coefficients are calculated by the processing system.

13. The audio device of claim 1, further comprising detecting an input from a sensor device, and in response calculating new algorithm coefficients and storing the new algorithm coefficients for use in detecting speech.

14. The audio device of claim 13, wherein the sensor device comprises a motion sensor and the input from the motion sensor is interpreted to detect motion of the audio device.

15. The audio device of claim 1, wherein calculating new algorithm coefficients comprises determining beamformer coefficients.

16. The audio system of claim 1, wherein the audio device comprises headphones.

17. The audio device of claim 1, wherein the adaptive signal processing algorithm is normally off, and wherein in response to the detection of a change in the noise level the adaptive algorithm is turned on before the new algorithm coefficients are calculated, and then the adaptive algorithm is turned off.

18. An audio device, comprising:
- a plurality of microphones that are configurable into a microphone array and are adapted to receive sound from a sound field and create an output; and
- a processing system that is responsive to the output of the microphones and is configured to:
  - use a normally off adaptive beamformer signal processing algorithm to detect speech in the output of the microphones, wherein the beamformer is configured to use multiple microphone outputs to detect speech in the output, and wherein the beamformer comprises a plurality of beamformer coefficients;
  - detect a predefined trigger event indicating a possible change in the sound field, wherein the predefined trigger event comprises one or more of an increase in noise in the sound field, the passing of a predetermined amount of time, and an input from a sensor device; and
  - in response to the detection of the predefined trigger event, turn on the adaptive beamformer, calculate new beamformer coefficients, store the new beamformer coefficients for use in detecting speech, and turn off the beamformer algorithm.

19. An audio device, comprising:
- at least one microphone adapted to receive sound from a sound field and create an output; and
- a processing system that is responsive to the output of the at least one microphone and is configured to:
  - use a signal processing algorithm to detect speech in the output;
  - detect a predefined trigger event indicating a possible change in the sound field, wherein detecting a trigger event comprises monitoring spatial energy changes; and
  - modify the signal processing algorithm upon the detection of the predefined trigger event.

20. The audio device of claim 19, wherein detecting a predefined trigger event comprises monitoring both spectral and spatial response changes.

* * * * *